United States Patent [19]

Tregerman et al.

[11] 3,737,868

[45] June 5, 1973

[54] APPARATUS FOR PREPARING A BINARY CODED RECORD

[75] Inventors: Leon Tregerman, Syosset; Stanley M. Brindle, East Setauket, both of N.Y.

[73] Assignee: Addressograph-Multigraph Corporation, Cleveland, Ohio

[22] Filed: Mar. 30, 1972

[21] Appl. No.: 239,445

[52] U.S. Cl. ...... 340/172.5

[51] Int. Cl. ...... G06k 3/00

[58] Field of Search ...... 340/172.5; 197/20

[56] References Cited

UNITED STATES PATENTS

| | | | |
|---|---|---|---|
| 3,660,616 | 5/1972 | Davidge et al. | 340/172.5 |
| 3,602,902 | 8/1971 | Madden | 340/172.5 |
| 3,676,854 | 7/1972 | Findeisen et al. | 340/172.5 |
| 3,244,364 | 4/1966 | Golden | 340/172.5 X |
| 3,411,141 | 11/1968 | Bernier et al. | 340/172.5 |
| 3,325,786 | 6/1967 | Shashous et al. | 340/172.5 |
| 3,175,763 | 3/1965 | Gotz et al. | 340/172.5 |
| 3,011,154 | 11/1961 | Dirks | 340/172.5 |
| 2,929,556 | 3/1960 | Hawkins et al. | 340/172.5 |
| 2,968,383 | 1/1961 | Higonnet et al. | 197/20 |
| 3,470,539 | 9/1969 | Proud, Jr. et al. | 340/172.5 |

OTHER PUBLICATIONS

I.B.M. Tech. Disclosure Bulletin, Vol. 10, No. 11, April 1968, Pages 1745–1747. "Data Collection Terminal"

*Primary Examiner*—Paul J. Henon
*Assistant Examiner*—Paul R. Woods
*Attorney*—J. Herman Yount, Jr. and Ray S. Pyle

[57] ABSTRACT

Keyboard encoding apparatus for preparing binary coded tape. The keyboard has special address keys for addressing a memory which, in response to the depression of a key, effects coding of a message on a tape comprising a plurality of words. The memory may be loaded from the keyboard or from paper tape and a punched tape is prepared when loading a memory from the keyboard. The memory may also be read to provide a check tape of data stored therein including key address and rub-out codes not stored in the memory. When loading the memory from the keyboard, the depression of a special key addresses the memory and data keys are operable to load the memory. The actuation of the special key in this mode effects a punching of a rub-out code and a key address code but does not store these in the memory.

14 Claims, 5 Drawing Figures

Patented June 5, 1973 3,737,868

2 Sheets-Sheet 1

APPARATUS FOR PREPARING A BINARY CODED RECORD

Coded tape is commonly used to control various operations, such as typesetting operations. Conventionally, a tape coding device controlled by a keyboard has been used to code the tape with binary words. The keyboard conventionally comprises a plurality of keys with each key representing a certain code word to be recorded. When preparing tape for controlling typesetting apparatus, the keys may represent alphanumeric characters as well as certain control codes which are used for controlling phototypesetting apparatus, such as elevate, carriage return, etc.

To simplify explanation, the description will proceed assuming the coding device is a punching apparatus for preparing punched paper tape. When a key on the keyboard is depressed, an encoder provides the corresponding code word for the key and the code word is transferred to the punching device to control punch solenoids. Conventionally, the punching apparatus includes an input buffer for receiving the code and a drive register for controlling the punch solenoids. Moreover, such apparatus has included means for inhibiting any operation of the keyboard when the punching apparatus is incapable of receiving more input data. Normally, the punching rate is sufficiently faster than the keyboarding rate that this does not present a problem.

In the conventional encoder, split keys are often provided. A split key is a key which will provide one of two codes or messages depending upon whether or not a shift key on the keyboard is simultaneously pressed.

When preparing any coded tape, there are certain messages which are often repeated. A message as used in the present specification is a plurality of code characters, for example, a person's address or a particular set of instructions which are commonly repeated. In certain prior art machines, keys have been provided which when depressed provide a plurality of codes upon the depression of a single key. However, the codes are hard-wired into the machine and it is necessary to change the wiring. While this might be done with plug-in units, it seriously reduces the flexibility of the encoder since the desired unit must be made up and on hand.

SUMMARY OF THE PRESENT INVENTION

In accordance with the present invention, a programmable memory may be loaded to store codes to be reproduced upon the actuation of a key for addressing the memory to provide a message output to a coding device for preparing a coded member. The memory is of the type in which the code stored in the memory may be readily changed in order to change the message which is outputted in response to the depression of the key. The depression of a key may also selectively effect the coding of the key address and preferably a predetermined code in advance of the address prior to any codes being read from the memory.

In accordance with the preferred embodiment of the invention, the memory may be loaded with data from the keyboard itself or from a tape reader for reading coded tape. Preferably, the coding device is operated, when loading the memory from the keyboard, to prepare a record member and, as a special key is depressed to address the memory, it is selectively operated to code the member with a predetermined code and the key address in advance of loading the memory and recording it on the memory.

In accordance with another aspect of the invention, while the memory is controlling the coding device, the keyboard of the encoding apparatus is inhibited until the message is completed. Similarly, if the memory is being loaded to store codes corresponding to a particular key, other keys capable of addressing the memory are rendered ineffective until the loading for the particular key is complete.

In the preferred embodiment of the present invention, the keyboard is activated to load the memory and to simultaneously punch a tape by transmitting the encoded information from depressing the keyboard data keys to a code marking device, e.g., a punching apparatus, and simultaneously to the input of a register from which the data is loaded into the memory.

In accordance with a further aspect of the invention, the depression of a key for addressing the memory may preferably selectively effect the coding of a "rub-out" code and a key code onto the record member and preferably selectively address the memory to selectively read or load the memory and to code the record member with the codes loaded or read and preferably the keyboard may be selectively used to code data on the record member following the code address instead of reading codes from memory.

Further objects and advantages of the present invention will be apparent from the following detailed description thereof made with reference to the accompanying drawings forming a part of the present specification for all subject matter disclosed therein and in which.

Figure 1:
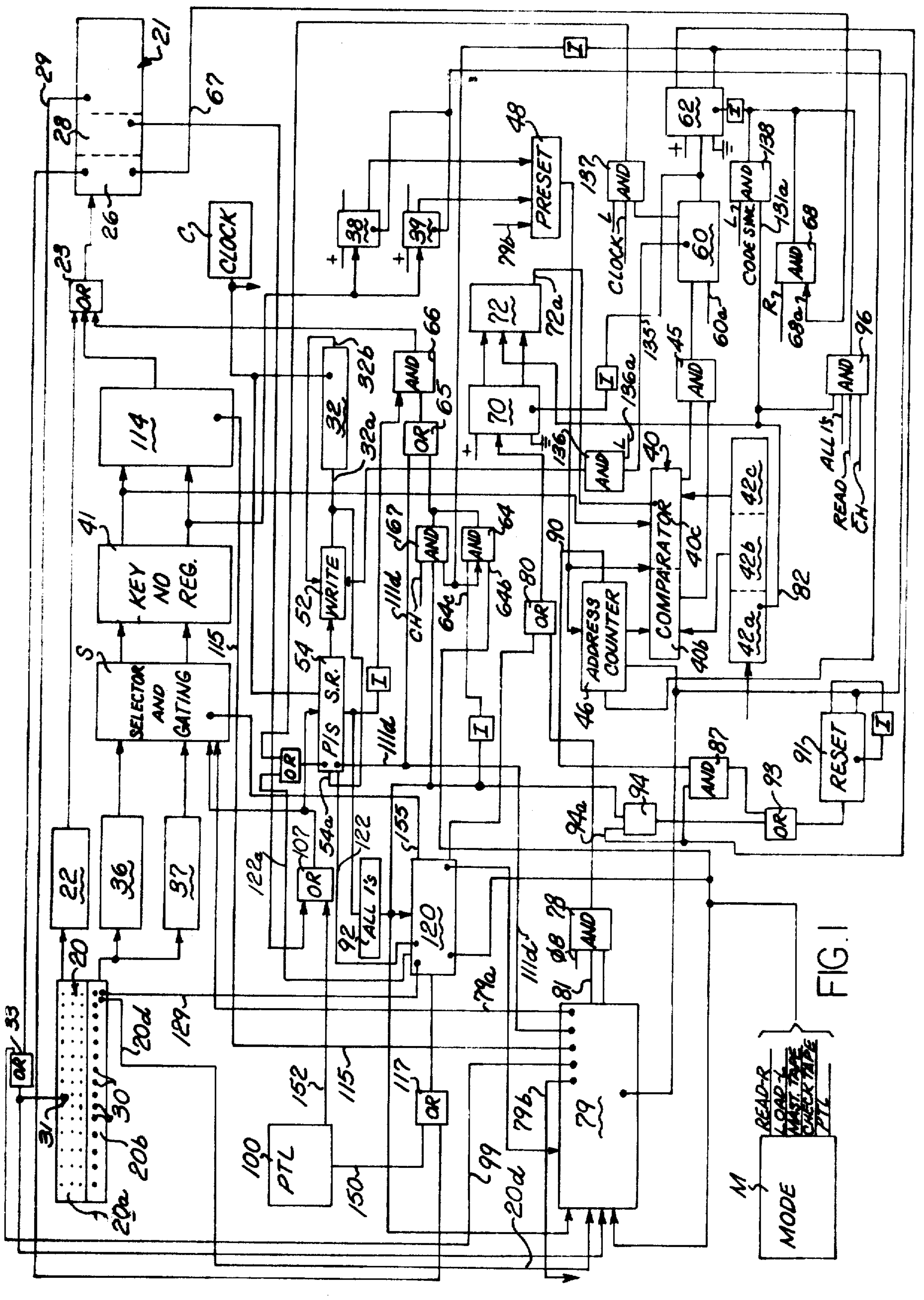
FIG. 1 is a diagrammatic showing of a preferred form of the present invention.

The present invention is described with reference to a coding apparatus for preparing a punched binary coded record, but it will be understood that the invention encompasses various types of coding, i.e., holes, magnetic, etc., onto various types of records, for example, tapes or cards.

A specific form of the preferred embodiment of the present invention is illustrated in the drawings. As illustrated therein, a keyboard 20 is provided for controlling a punching apparatus 21 for preparing punched paper tape such as tape for use in controlling typesetting equipment. Conventionally, the keyboard 20 includes a plurality of keys which represent respective alphanumeric characters or control or function codes for effecting the proper operation of the typesetter. The keyboard 20 has a conventional alphanumeric and function keyboard portion designated by the reference numeral 20a and when a key in that portion is depressed during conventional operation, a key encoder 22 is activated to provide a code signal which is used to activate the punches in the punching apparatus to provide the proper output code word corresponding to the alphanumeric character or control code assigned to the key. For example, the binary code word for an alphanumeric character or number may be a six digit binary code for an alphanumeric character and the depression of the corresponding key on the key on the keyboard will cause the key encoder 22 to provide the proper binary code which is outputted through an OR gate 23 into a buffer 26 in the punch apparatus 21. While a six digit code is used for a character, the apparatus is conventionally adapted to punch eight channel tape to provide channels for additional bits for various purposes such as split keys, or control codes which may also be punched from the keyboard.

The punching apparatus 21 includes a drive register 28 which controls punch solenoids to effect a punching or no-punching in accordance with the binary code stored in the register. The shifting of information from the buffer 26 to the punch control register 28 is done when the information in the punch drive register has been punched out and the register is in a position to receive new data.

The punching apparatus has a keyboard inhibit output connection 29 which will have a low level inhibit signal thereon for inhibiting any output from the keyboard 20 when the buffer 26 of the punching apparatus has data stored therein. This connection is applied to a terminal 31 of the keyboard through an OR gate 33 to inhibit any output from the keyboard when the punch apparatus data registers are filled.

Keyboard 20 also has a plurality of special keys 30 in a special key section 20*b* of the keyboard. Each one of these keys may address a recirculating memory 32 for storing a plurality of codes corresponding to each special key. In the illustrated embodiment, the keyboard section 20b contains 16 special keys, one key being a split selector key as will be further explained hereinafter.

The apparatus as illustrated has several modes of operation, one of which is termed the "Read" mode. While several Read modes are available in the simple Read mode, the memory is addressed on the actuation of a special key and the codes stored in a memory section for the key will be punched. The depression of a special key 30 in the section 20*b* activates a key encoder 36 to provide a binary code corresponding to the address of the section of the memory 32 where the codes corresponding to the key are stored. This binary address code for the key is then used to address the memory 32 to effect a readout of the message, which message is comprised of a plurality of character codes stored in adjacent memory locations in the memory section for the key and the punch apparatus 21 is operated to punch these codes onto a tape. As an example, the memory 32 may be a recirculating memory capable of storing 64 character codes for each of the special keys in the keyboard section 20*b*. When a special key is depressed, the key encoder 36 provides the key code which corresponds to the memory address for the first code of the message for that particular key.

In the preferred embodiment, the key may be a split key, i.e., it may have two strings of 32 codes maximum assigned to it with a particular code string to be selected being controlled by a split selector key depressed or not at the same time as the special key. When a special key is a split key, a circuit 37 will signal whether the split selector key is or is not depressed. This indication will indicate whether the desired character codes are in the first 32 or the second 32 locations in the memory section assigned to the particular special key. This information will be used to set split flip flops 38, 39 to indicate that the key is or is not split and to indicate whether the split key corresponds to the first location or the second location assigned to the memory. The flip flop 39 indicates the latter while flip flop 38 indicates the former.

The outputs of the circuits 36, 37 are applied to selector and gating circuitry S. This circuitry is set in accordance with the desired mode of operation as determined by a mode circuit M to select input data from the keyboard 20 or from a paper tape loader 100. In the Read mode of operation the keyboard input is set. The circuitry S will be activated in response to the depression of a special key to gate the setting of the circuits 36, 37 to a key number register 41 where the key code is used by a comparator 40 to address the memory 32.

The comparator 40 has one input section, section 40*c*, connected to the key number address register 41 and a second input to a section 42*c* from an address counter 42 which is clocked in synchronization with the shifting of the bits in the recirculating memory 32. The counter section 42c of the counter 42 has stages whose setting will be the address of the portion of the memory containing the codes for a particular special key. The memory counter 42 also contains a bit counting section 42*a* and a code counting section 42*b*. As each shift of the bits occurs in the recirculating memory 32 in response to clocking by a data clock C, a clock input from the data clock C is made to the section 42*a* of the counter 42 to increment the section 42*a* and when the bit counter 42*a* has counted eight bits (when an eight-bit code is being used for the character code), code section 42*b* is incremented and when the code section has effected 64 counts, the key section 42*c* is incremented.

In initially addressing the memory system, the section 40*c* of the comparator determines when the key section 42*c* of the memory counter 42 corresponds to the address in the key number register. When the address from the key number register 41 matches the count in the section 42c of the counter as determined by the key encoder 37, the comparator circuit 40 applies a conditioning signal to an AND gate 45. The AND gate 45 is not necessarily activated at this time. It is also necessary to start reading the codes for a key section at the beginning of the code locations of the memory section address. This is accomplished by presetting a code address counter 46 to establish a count of zero or 32 in the code address counter 46 depending on whether the key is a split key and if a split key, on whether the code string is in the first or second of the memory sections for the key. The preset count added to the address counter is determined by the flip flops 38, 39.

The flip flops 38, 39 control a preset circuit 48 for presetting the address counter as well as the comparator in the proper manner to effect the proper comparison.

With the code address counter 46 set, its address is compared with the data in the code section 42*b* of the memory counter 42 by a comparator section 40*b* of the comparator 40. When the digits of the code section correspond to the setting of the address counter 46 indicating the beginning of the code string for the key of a new key section, the section 40*b* provides an output signal to the AND gate 45 and the AND gate is now activated. When the AND gate 45 is activated by the comparator sections 40*b*, 40*c*, it effects a readout from the memory 32, as explained hereinafter.

In the illustrated embodiment, the memory 32 has an input 32*a* and an output 32*b*. The data stored in the memory is recirculated from the output 32*b* through a circuit 52 to the input 32*a*. Normally, the data being recirculated flows through the circuit 52 to the input 32*a*. The circuit 52 is provided to enable other data to be written into the memory as will hereinafter be explained. The input 32*a* of the recirculating memory 32 is also applied to an input 54*a* of a shift register 54. As the data is recirculated to the input 32*a* it is also shifted into the shift register 54. Every eight bits which are shifted into the shift register 54 will cause an incrementing of the character code counter 42*b* and when there is a comparison in both the code section and the key section of the comparator 40, the output from AND gate 45 will activate a conversion synchronizing circuit 60 to provide an output signal to a conversion-complete flip flop 62. When the compare signal is established, the next data clock will set the synchronizing circuit and the output of the compare circuit and the synchronizing circuit will endure for eight bits after establishment of the respective output; when the circuit 60 loses its output, the desired code is in the shift register 54 and in the initial location of the recirculating memory.

The conversion-complete flip flop 62 is set on the loss of output from the circuit 60. When the flip flop 62 is set, it will cause a gating of the information in the shift register 54 to the input buffer 2 by activating an AND gate 64. The output of AND gate 64 is connected to an OR gate 65 whose output activates an AND gate 66. The AND gate 66 has inputs connected to the shift register 54 through an inverter I and when activated gates the setting in the shift register in parallel to the punching apparatus through the OR gate 23. The AND gate 64 has an input 64b which has a Read mode signal thereon in the Read mode and an input 64c which has a signal indicating that the shift register does not have all 1's therein.

The conversion flip flop 62 immediately resets when the code has been accepted by buffer 26 through a print-enable connection 67 from the buffer 26. The print-enable connection 67 is connected to one input of AND gate 68 which has a second input 68*a* conditioned by a Read mode signal during the Read mode of operation. The output of the AND gate 68 is connected to the reset terminal of the flip flop 62 through an inverter I.

The resetting of the flip flop 62 increments the address counter 46 by one increment to condition the circuitry to seek the next code to be read into the buffer.

In the illustrated embodiment, the comparator 40 is normally disabled to effect a comparison. The comparator is enabled by the output of a compare-enable flip flop 72 having an output 72*a* connected to the comparator 40.

The compare--enable flip flop 72 is set in response to the setting of a seek address flip flop 70. The flip flops 70, 72 are of the type in which the flip flop has steer-on and steer-off terminals and a trigger terminal. Such a flip flop has been shown in FIG. 4 and has been designated by the reference numeral 75. The steer-on and steer-off terminals are conventionally schematically indicated by a line at the top and bottom, respectively, of the left-hand side of the flip flop and have been designated in FIG. 4 as 75*a*, 75*b*, respectively. The triggering terminal is conventionally shown intermediate the steer-on and steer-off terminals and has been designated by the reference character 75*c*. The flip flop can be turned on, i.e., actuated to a set condition, by applying a steer-on conditioning or data signal to the steer-on input 75*a* and a triggering signal to the triggering input. Similarly, when in a set state, the flip flop can be turned off, i.e., reset, by applying a steer-off conditioning or data signal to the steer-off terminal 75*b* and a triggering signal to the triggering terminal 75*c*. In operation, a clock signal may be applied to the triggering terminal to effect a setting or resetting of a flip flop in accordance with the steer-on or steer-off signals. Also, the steer-on signal might be connected to a continuous steer-on voltage source and the signal from the clock or other actuating circuit applied to the trigger terminal to steer the flip flop on. If steer-on and steer-off voltages are simultaneously applied, a triggering signal will trigger the flip flop between its states. This type of flip flop also has a reset terminal indicated by a terminal 75*d* in the center of the box adjacent the lower margin. When a low level input is applied to this reset terminal, the flip flop is reset to and clamped in its reset or off state and cannot be switched by a triggering signal. Before the triggering terminal can effect control of the flip flop, a high level or logic 1 must be applied to the reset terminal. The outputs of the flip flop are conventionally indicated as a set output 75 *e* and a reset output 75*f*, a set output being represented by a line adjacent the top right-hand margin of the box and the reset output by an output line from the lower right-hand side of the box. When the flip flop is set, the set output has a high signal on it and when it is reset, the reset output has a high level existing on it.

In the drawings and the description, data is clocked through the system by the data clock operating at approximately 1 megacycle rate and for a flip flop, such as the flip flop 72 where only a line is shown at the trigger terminal, a data clock or another signal effects the triggering of the flip flop. If only an input is shown to the center left-hand margin of the box, it indicates that the steer-on terminal has a continuous steer-on signal applied and the activating signal is that shown at the center of the box. If the only other connection is to the reset terminal of the box, it indicates that the flip flop is reset by applying a signal to the reset terminal.

In the Read mode under discussion, the seek address flip flop 70 and the compare-enable flip flop 72 are initially set from an initializing circuit 79 which is responsive to the depression of a special key 30 in the special key section 20*b*. When a special key 30 is depressed, a signal is applied over a connection 20*d* to initializing circuitry indicated schematically by the reference numeral 79. The activation of this circuitry in response to a depressed key provides a signal on an output connection 79*a* to activate the gating circuitry S so as to gate the special key encoded information into the key number register 41 to provide an address for the comparator 40 and to set the split key flip flops 38, 39 in accordance with the special key information. In addition, a signal is applied over connection 79*b* to activate the preset circuit 48 to set the address counter and comparator. Also, a continuous output is effected on an output connection 81 to an AND gate 78 whose output is connected through an OR gate 80 to the trigger terminal of the seek address flip flop 70 to set the same to provide an output to the steer-on terminal of the flip flop 72. A read R but not master tape $\overline{MT}$ mode conditioning signal is applied to an input for the AND gate 78 from an OR gate 84 having an input from an AND gate 85 which has conditioning inputs R and $\overline{MT}$ from the mode circuit M, see FIG. 2.

The setting of the seek address flip flop 70 is done in response to the activation of the AND gate 78 by a phase B signal applied to the terminal of the flip flop. In the illustrated embodiment, the phase B signal is a square wave signal which is derived from the punching apparatus in synchronism with the punching of the tape so that when a phase B signal appears, the buffer 26 of the apparatus is in a condition to receive a code. This synchronizes the data flow into the punch apparatus with the rate of punching.

The compare-enable flip flop 72 is set after conditioning by a code-sync signal which is derived from an output 82 of the bit counter section 42*a* of the memory counter 42 which provides an output signal after each eight bits corresponding to a code being shifted into the shift register 54. Consequently, the compare-enable flip flop is set between bits and enables the comparator 40 beginning with the first bit of a character code.

The seek address flip flop 70 is reset and in turn the compare-enable flip flop 72 is reset in response to the output of the synchronizing circuit 60. The output of the synchronizing circuit 60 is applied to the reset terminal of the flip flop 70 through an inverter so that the level at the reset terminal of the flip flop 70 goes low when a high output is established from the synchronizing circuit 60.

In view of the continuous conditioning signals on the AND gate 78, it is clear that the phase B clock signal following the resetting of the flip flop 70 will again set the flip flop 70 to seek the new address set in the address counter 46 as a result of the incrementation of the counter by reason of the reading out of the earlier address. This mode of operation will continue until the initializing circuit 79 is reset by a total count signal T.C. from the counter 46 or by the appearance of all 1's at the output of the shift register 54. When the count in the address counter 46 reaches the total count representing the maximum number of possible storage locations in the code string, an output signal will appear on an output 90 from the counter to operate a circuit 91 to provide a reset signal to the initializing circuit 79 to effect a resetting of the initializing circuit which effects the loss of the conditioning gate signal to the AND gate 78 and removes the inhibit from the keyboard 20.

The total count signal T.C. is applied to the reset circuitry 91 through an AND gate 87 and an OR gate 93. The other input of the AND gate 87 is connected to the set output of the conversion complete flip flop 62.

The circuit 91 may also be set by a signal from an all 1's detector 92 indicating that a code of all 1's is present in the shift register. Such a code in the Read operation indicates that the end of the code string has been reached and this will occur when the code message stored for the key has less than the number of storage locations assigned to the key and a tape feed code has been stored in the memory as the last character code. The tape feed code is entered into the memory 32 as all zeros but when data is entered in the memory 32, it is inverted and circulates through the memory as an inversion of the entered code. Consequently, when the code appears at the shift register to be read from the shift register, it is an inverted code of all 1's.

The all 1's output signal from the circuit 92 to the OR gate 93 is anded with the set output of the conversion-complete flip flop 62 in an AND gate 94. The circuit 94 may be a flip flop having the output of OR gate 93 applied to the triggering terminal and which resets itself when set and has been so illustrated by having its set output connected to its reset output through an inverter.

When the all 1's signal appears at the output of the shift register 54, the output of the all 1's detector inhibits the AND gate 64, the output being applied to one input of AND gate 64 through an inverter. This prevents the tape feed code from being read into the punching apparatus. In this condition, an AND gate 96 is activated to reset the flip flop 62.

When the initializing circuit is initially activated in response to the depression of a special key code in the Read mode, the initializing circuit preferably provides a keyboard inhibit signal on a connection 99 between the initializing circuitry and the keyboard. This signal is ored with the keyboard inhibit signal from the buffer 26 in OR gate 33 and applied to the keyboard 20 to render the depression of the keys on the keyboard ineffective after the initializing circuit has been set and until the initializing circuit has been reset.

Figures 2, 3, 4, 5:
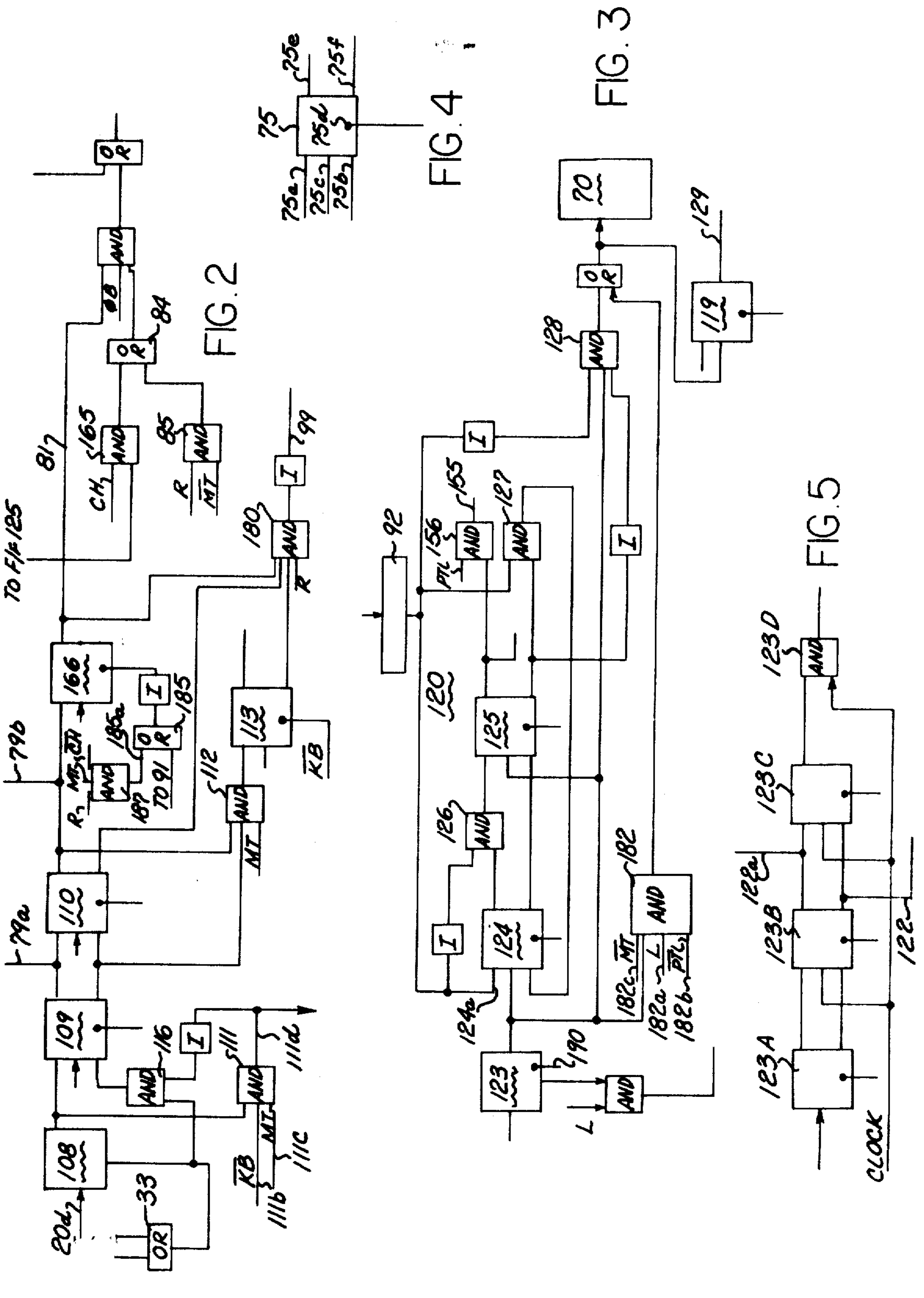
FIG. 2 is a sub-block diagram of part of an initializing circuit used in FIG. 1.
FIG. 3 is a diagram of timing circuitry used in the circuit of FIG. 1.
FIG. 4 is a schematic diagram of a flip flop.
FIG. 5 is a schematic diagram of a portion of FIG. 3.

FIG. 2 illustrates a portion of the initializing circuit 79 for supplying gating and inhibiting signals. The depression of a special key applies a signal over connection 20d to the triggering terminal of a flip flop 108 to set the flip flop. The setting of the flip flop 108 allows a clock pulse to set a flip flop 109 having a set output connected to supply a signal over line 79*a* to gate the information from circuits 36, 37 to the key number register 41 and to the flip flops 38, 39.

The setting of flip flop 109 also conditions a flip flop 110 to be set by a data clock pulse to supply a signal over connection 79*b* to the preset circuit 48 to render it effective and to condition a flip flop 166 to be set by a data clock. The setting of flip flop 166 supplies the signal on connection 81 to AND gate 78 to condition it to be activated by the phase B signal. The flip flop 166 in this mode of operation remains set until it is reset by the circuitry 91.

The recirculating memory 32 may be loaded in the specific form of the illustrated embodiment by operation of the keyboard 20 or by a paper tape loader 100. When the memory is to be loaded a load signal L is provided by the mode circuit M. Also if a tape is to be punched with a rub-out code and key address when loading from the keyboard, a master tape mode signal MT is established. It will be first assumed that a tape containing the rub-out code and key address is to be prepared as the memory is loaded, a rub-out code is a code of all 1's.

When a special key is depressed in this mode of operation, the depressed key signal is applied to the initializing circuitry 79 as in the case of the Read mode of operation. Also as in the Read mode, this will effect a gating of the information from circuits 36, 37 to the key number register 41.

Referring to FIG. 2, the special key in the master tape mode MT sets the special key flip flop 108 by applying a signal to its trigger terminal when the key is depressed. The setting of the flip flop 108 conditions the flip flop 109 to be set by the data clock which is applied to its trigger terminal to supply the gating signal over connection 79*a* and to condition a flip flop 110 to be set by the data clock which is applied to the trigger terminal of flip flop 110 to activate the preset circuit 48. The setting of the flip flop 108 activates an AND gate 111 which has second and third inputs 111*b*, 111*c*, respectively, conditioned by the NOT keyboard reset signal from OR gate 33 and a master tape mode signal MT to provide a signal on a connection 111d for forcing the shift register 54 to register all zeros and for activating the AND gate 66 through the OR gate 65 to read out the information into the punch buffer. The output signal from the AND gate 111 is also applied through an inverter and an AND gate 116 to condition flip flop 109 to be reset by the data clock provided a NOT keyboard reset signal $\overline{KB}$ applied to a second input thereof is high signifying that the buffer can accept data. The resetting of flip flop 109 activates an AND gate 112 for supplying a trigger signal to set a gate punck key address flip flop 113. The AND gate 112 has a mode conditioning MT input from the mode circuit. The flip flop 113, when set, will provide a signal over a connection 115 to AND gating 114 to gate the key address to the punch input buffer 26.

When the all 0's code appearing at the output of the shift register on the depression of a special key in the Load-Master Tape mode of operation is gated to the registers of the punching apparatus, it is inverted to all 1's and when it is punched, it is punched as all 1's, i.e., a rub-out code. When a code is gated into the punch drive register 28, it is also applied to the input of the shift register 54. The punching of a code provides a sprocket gate pulse signal on an output connection 121 from the punching apparatus circuitry in synchronism with the punching operation. Accordingly, when the rub-out code of all 1's is gated into the punch drive register and to the input of shift register 54, the sprocket signal is generated in synchronism therewith and applied to a timing circuit 120.

The timing circuit 120 comprises a delay circuit and a sprocket pulse applied at the time all 1's are registered in the shift register will effect the conditioning of the circuit to provide an output signal from the circuit in response to the second next following sprocket pulse.

Assuming that the timing circuit 120 has been conditioned in response to a first all 1's detection, the next sprocket gating pulse will effect further operation of the timing circuit provided the parallel shift register does not then have all 1's registered therein. If an all 1's is registered in the shift register and the all 1's detector circuit 92 has an output so indicating, the circuit 120 is reset.

Referring to FIG. 3, the timing circuit 120 may comprise delay circuit means 123, e.g., flip flops 123A, 123B, and 123C, as shown in FIG. 5, with the flip flop 123A being triggered by the sprocket pulse and the others being triggered in sequence by the data clock. When the flip flop is set, the reset output of flip flop 123B conditions the shift register for parallel load and the reset output is connected to provide a parallel load signal to the shift register. The circuit 123 first provides the parallel mode load signal on a connection 122 and then the load signal on a connection 122a and then an output pulse to a flip flop 124 is through a clocked AND gate 123D. The circuits 123A–123C are reset by the data clock when the sequence has occurred.

The output from the delay means 123 sets the flip flop 124. The flip flop 124 will be set provided there is an all 1's detect on its steer-on input 124*a*. The setting of this flip flop then conditions a following flip flop 125 to be set by the next signal from the delay means 123 provided the all 1's signal is no longer present at the input 124*a*. The set output of the flip flop 124 is anded in an AND gate 126 with a signal which is the inversion of the all 1's detect output. The output of the AND gate 126 is connected to the steer-on terminal of the flip flop 125. If the all 1's signal is still present on the input terminal 124*a* of the steer-on flip flop 124, the inverted signal to the AND gate 126 will prevent the set output from the flip flop 124 from applying an activating signal to the AND gate 126 to provide an output on the steer-on terminal of the flip flop 125 and prevent this from being set in response to the next pulse from the delay circuit means 123. In addition, an AND gate 127 has an input connected to the output of the all 1's detector 92 and a second input connected to the reset output of the flip flop 125. Consequently, the second pulse will reset the flip flop 124 if the all 1's input is still present after the setting of the flip flop in response to an initial all 1's input. This means that the timing circuit 120 is reset if there are two all 1's in a row and will be set to provide an output from its reset terminal through an inverter I to an AND gate 128 if the first all 1's is followed by a different code.

The AND gate 128 has an additional input connected to receive the pulse from the delay circuit means 123 and a third input connected to the output of the all 1's detector 92 through an inverter I. The AND gate 128 also has a mode conditioning input from an OR gate 128A which has MT and PTL signals. A PTL signal is established when loading from tape as described hereinafter.

It will now be seen that the AND gate 128 is conditioned to pass the pulses from the delay circuit 123 when the circuit 125 is in its set state and the output from the all 1's detector is not an all 1 output, i.e., high level output. The output of the gate 128 is applied to the trigger terminal of the seek address flip flop 70.

In the illustrated embodiment, the key address will be registered in the punch drive register following the rub-out code and this will be applied to the input of the parallel shift register so that all 1's will not be present in the register and the gating sprocket pulse will produce a signal which is gated by the AND gate 128 to trigger the seek address flip flop 70. This seek address flip flop will not be set, however, by the gated sprocket pulse which corresponds to the key address code since it is the trailing edge of a pulse which sets the flip flop 125 and until this flip flop is set, the AND gate 128 cannot be activated. Accordingly, it is the following pulse from the timing circuit 120 which will set the seek address flip flop 70 and this will occur when the keyboard operator depresses a data key. When the keyboard operator depressed the data key, he will again load the punch drive register and this will be gated into the shift register 54 and the gated sprocket signal will now activate the seek address flip flop 70 to provide a steer-on input to the compare-enable flip flop 72 to enable the code-sync signal to set this flip flop. The circuitry will now operate to seek the address which is in the code address counter and in the key number register. The readout from the key number register is a nondestructive type readout and, consequently, the key number code remained in the register after being gated to the punching apparatus and remains there until the next key number is inserted.

It will be recalled that the depression of a special key during the Read mode inhibited the keyboard 20. In the special keyboard load mode, there is no inhibit keyboard 20 until the first bit of information is clocked into the memory. To this end, the output of AND gate 128 sets a flip flop 119 to apply an inhibit signal over connection 129 to only the section 20*b* of the keyboard.

As each individual key is now punched, the key encoder 22 applies key information directly to the punch drive apparatus 21 and the data to the drive register 28. Simultaneously, with the gating to the drive register it is gated to the input of the shift register 24 to be loaded into the memory.

When the first address is located for the first character code to be loaded, the comparator 40 will provide a signal to activate the synchronizing circuit 60. The synchronizing circuit 60 has an output 135 upon which a write signal appears and which is gated by an AND gate 136 which has a load mode conditioning signal L applied to its input 136*a*, to the input of write circuit 52 to enable a writing of the information in the parallel shift register 54 into the recirculating memory. The write signal endures for 8 bits while the circuit 60 is activated by the compare signal.

The synchronizing circuit 60 also has an output connected to a data clock gate 137 conditioned by a Load mode signal L for clocking shift pulses to the shift register 54 to shift the information from the register into the recirculating memory. The output of circuit 60 maintains the gate 37 conditioned to pass eight pulses to the shift register 54 to shift that information into the recirculating memory. After eight pulses, the conversion-complete flip flop 62 is set and then reset by the code-sync signal applied through an AND gate 138 conditioned by a load mode signal L to advance the address counter 46.

The next data key which is depressed will again provide a sprocket pulse which the timing circuit will pass to the seek address flip flop 70 to again set the flip flop to load the new key data. Data will continue to be loaded until the address counter reaches a total count to provide a T.C. signal to the reset flip flop 91 or until the "Tape Feed" key on the keyboard is punched to load all 0's into the memory. When the 0's are loaded into the memory, they are inverted and appear in the shift register as all 1's at the end of the loading operation since the information loaded into the memory 32 is also shifted into the shift register. This will activate the AND gate 94 when the flip flop 62 is set to activate the reset circuit 91 for resetting the timing circuit 120 and the initializing circuit 79.

When the memory is to be loaded in the punch tape mode, PTL, the punch tape reader in the loader 100 will operate to supply the coded information to the memory. Each key address in the paper tape loader 100 will be preceded by a rub-out code, that is, an all 1's code. This will be followed by the key address code and then the data field will follow the key address code. Following the data field will be a tape feed code of all 0's, i.e., a code indicating the end of the code string, unless the field is a full field of maximum permissible codes for the key. The punch tape reader includes a select key which when selected inhibits the keyboard 20 so it cannot operate. The key also provides a PTL signal to the mode circuitry M for conditioning various gates to be effective in this mode of operation and for providing any necessary inhibit signals on other gates.

Each time the paper tape loader reads a character code, a PTL gate signal is applied to the OR circuit 117 over a connection 150 and the code read by the reader is applied over a path 152 to the input of OR gate 107 whose output is connected to the parallel input terminals for the parallel-to-serial shift register 54. The gated PTL signal activates the timing circuitry 120 for loading the shift register with the data and operates to condition the timing circuitry 120 to provide an output pulse to the seek address flip flop 70 provided there is an all 1's output on the all 1's detector 92. An all 1's output will be present when the paper tape reader reads the rub-out code immediately ahead of a key address and, therefore, the timing circuit is conditioned to provide a signal on its output to the OR gate 80 to activate the seek address flip flop 70 in response to the second next PTL gate pulse from the paper tape reader. The next PTL pulse will occur when the reader has read the next character code which will be the key address. When this code is read and the PTL gate signal occurs, the code will be set into the parallel shift register and the condition of the circuit 120 to pass pulses will be established. The conditioning circuit 120 will also cause the gating of the key address into the key number register 41. The code address is supplied to the selector and gating circuitry S from the output of the OR gate 107. An output of circuit 120 is applied to the gating circuit S over a connection 155. In FIG. 3, connection 155 is made to the set output of flip flop 125 through an AND gate 156 conditioned by a PTL load signal. The change in level on the setting of flip flop 125 effects the gating.

As in the case of loading the memory from the keyboard, if the next code after the all 1's code is also in all 1's code, the conditioning of the timing circuit 120 to activate the seek address flip flop 70 will not be effected and the timing circuitry 120 will be reset. If the code is not an all 1's then the AND gate 128 is conditioned.

As in the case of loading from the keyboard, it is the next code which will trigger the seek address flip flop 70. When the next code is read from the paper tape loader into the shift register 54, the seek address flip flop will be set in response to the PTL sprocket pulse and the circuit will operate to seek the address set into the key number register and when a comparison is made, the output from the comparator 40 will activate the synchronizing circuit 60 to activate the AND gate 137 for supplying pulses to shift the code into the recirculating memory 32 in the same manner as explained in the mode of loading from the keyboard. When eight bits have been applied to shift the information into the memory in an inverted form, these bits will also have been shifted into the shift register 54 at the end of eight bits.

It will be noted that the circuitry will ignore a rub-out code on the tape which appears after the key address code. When the sprocket pulse for such a code appears, the all 1's output from circuit 92 will inhibit the AND gate 128 (FIG. 3) and the seek address flip flop 70 is not set. This means that an erroneous code on the tape may be converted to all 1's and it will be ignored in loading the memory.

When a tape feed signal is loaded, it will read as all 1's after loading and this will cause the resetting of flip flop 62 to activate the circuitry 91 to reset the timing circuitry 120 so that a rub-out code followed by a key address must be present before loading again continues.

The present encoding apparatus is also such that the memory can be read out to prepare a check tape for information stored therein. In preparing a master tape, each special key is activated and the apparatus will punch out the codes stored by the memory for the key preceded by the rub-out code and key address. In this mode of operation, the mode circuit M conditions the read output R of the mode circuit, the master tape output, and a check tape output CH. When the read circuit is conditioned, the circuit will operate in essentially the same manner as when operating the keyboard to punch the tape with the special keys being operated to punch the messages without the key address or rub-out code. In the check tape mode, the MT signal is applied to the AND gate 111 and to the AND gate 112. When a special key is depressed, the initializing circuit is activated to gate the output of circuits 36, 37 to the key number register and the AND gates 111, 112 will be operated to force the shift register to all 0's which is inverted and supplied to the input register of the punching apparatus and then to effect a transfer of the key code from the register 41 to the input buffer to effect a punching of both the rub-out code and the key code. It will be noted that the flip flop 113 for gating the key number to the input buffer 26 cannot be set until the flip flop 109 is reset indicating that the key number is in the register 41, see FIG. 2.

In this mode of operation, the AND gate 78 is conditioned to activate the seek address flip flop in response to the phase B. Signal. This is delayed until after the flip flop 125 in the timing circuit has been set indicating that the rub-out code and key address have been gated to the input buffer 26. Accordingly, after the rub-out code and key address have been loaded in the input buffer, the system starts to read out the codes in the memory for the key.

Referring to FIG. 2, the circuitry includes an AND gate 165 connected to the output of flip flop 125 and conditioned by a check tape mode load signal CH. When the special key is depressed, flip flops 108, 109, 110 are operated to gate the number into the key number register and to effect the gating and punching of the rub-out code and key address as explained above. The output of flip flop 110 effects the setting of flip flop 166 to condition AND gate 78. for operation to set the seek address flip flop 70 when the flip flop 125 activates gate 165 and the gate is activated by the phase B signal. When the address of the first code for the key is found, the code will be immediately gated to the input buffer of the punch by the conversion flip flop and the seek address flip flop 70 again set on the next phase B signal.

This operation will continue until the address counter provides a total count signal output or until the all 1's detector detects all 1's at the output of the shift register 54. In the regular read mode of operation, the all 1's code at the output of the shift register 54 is not gated to the tape. However, this is to be gated in the check tape mode. Accordingly, a read gate 167 is provided which is conditioned in the check tape mode by a mode condition signal CH applied to the input thereof to gate the all 1's code to the tape. As explained above, the all 1's code will be inverted and recorded as all 0's, i.e., a tape feed code. Gate 167 receives a conditioning signal from the reset input of the flip flop 62 which is reset as in the read mode immediately upon acceptance of the data by the buffer register 26 upon the finding of an address. The other input of the AND gate 167 is connected to the all 1's detector.

As noted above, a keyboard inhibit signal is applied to the keyboard in response to the depression of a special key. This signal on connection 99 may be derived from the output of an AND gate 180 having inputs from the reset outputs of flip flops 109, 113 and from the set output of flip flop 166 as well as a Read mode input R. Accordingly, the inhibit on the keyboard is established by the circuit 79 after the key number has been gated to the register 41.

In the disclosed embodiment of the preferred form of the invention, the memory may be loaded from the keyboard without punching the rub-out code and key address. In this mode of operation, the load mode signal is established but not the master tape signal MT for conditioning gates 111, 112. Also, an AND gate 182 has one input connected to the output of delay circuit 123 and its output connected to the OR gate 80 to activate the seek address flip flop upon the occurrence of a sprocket pulse. The AND gate is conditioned by load, NOT PTL, and NOT MT, signals on its inputs **182*a*, 182*b*, 182*c*, 182*d*. Upon the actuation of a special key in this mode, the flip flops 108, 109, 110 are actuated to gate the key address to the key number register 41 but no "Read Out" code or key address is punched since the gates 111, 112 were not actuated. When a data key is now depressed to load the memory, the AND gate will pass the sprocket pulse to the OR gate 80** to set the seek address flip flop and load the memory as in the mode where the key address and Rub-Out code are punched in the tape.

The disclosed embodiment of the preferred form of the invention may also be used to prepare a tape with the rub-out code and key address without loading the memory or reading from the memory. In this mode of operation, the read mode signals and the master tape signal MT are established. The MT signal conditions AND gates 111 and 112 to effect the punching out of the rub-out and key code. In this mode of operation, the flip flop 166 is clamped in a reset condition by a conditioning signal applied to one input **185*a* of an OR 185 having its output connected to the reset terminal of flip flop 166 through an inverter I. The input 185*a* is connected to the output of an AND gate 187 which has Read, MT and $\overline{CH}$ signals on its inputs. This prevents the initializing circuit and the addressing circuit from being effective during this mode of operation. The OR gate 166 also has an input connected to the reset output of the circuit 91.** It can now be seen that the operator may punch out the rub-out codes and special key address and then follow with the actuation of data keys to prepare a master tape from the keyboard without loading the memory.

During read operations, the shift register 54 is not to be loaded with the information being punched. Accordingly, a Read mode signal is applied to a reset terminal of the delay means 123 over a connection 190. The signal is an inverted Read signal to inhibit the delay means during the Read modes.

From the foregoing, it can be seen that the present invention provides a programmable memory means which can be loaded from the keyboard or from a paper tape loader and which can be addressed from the keyboard by depressing a single key to provide a message output. Moreover, the system has extreme flexibility by reason of its various modes of operation. While the memory has been described as having a fixed number of locations for each addressing key, a variable number of storage locations can be assigned by entering a key code in the memory for addressing purposes or by registering and storing the initial and terminal addresses for each key.

What is claimed is:

1. An encoding apparatus comprising a coding device for producing binary coded words on a record member, a manually operable keyboard having a plurality of manually operable keys including data keys and memory addressing key means, means connecting said keyboard to said coding device to activate the latter on depression of a data key comprising encoding means responsive to actuation of said data keys to provide binary coded signals representing binary code words each corresponding to a respective one of said data keys, programmable memory means having storage locations for storing a plurality of binary coded words, and addressing means for addressing said memory means including means for addressing a respective plurality of said memory locations in response to the actuation of said addressing key means and for reading said memory means to effect control of said coding device from said memory means to code a message comprising a plurality of binary words on said member.

2. An encoding apparatus as defined in claim 1 wherein said keyboard has a plurality of addressing keys for addressing said memory means and said memory means has a plurality of binary word storage locations for each addressing key.

3. An encoding apparatus as defined in claim 1 wherein said addressing means comprises circuit means for addressing said memory means in response to the depression of addressing key means and for then loading said memory means in response to the actuation of data keys on said keyboard.

4. An encoding apparatus as defined in claim 3 wherein said means connecting said keyboard to said coding device comprises a register for registering a binary coded word from said encoding means in response to the depression of a data key, and means connecting said register to said coding device to actuate the latter and to said programmable memory means to load said memory means with the code in said register.

5. An encoding apparatus as defined in claim 1 comprising record reading means for reading a record having memory addresses coded thereon each followed by data code words to be loaded in said memory means, said addressing means including means responsive to the reading of a memory address on said record reading means for loading said memory means with codes following the memory addresses thereon.

6. In an encoding apparatus as defined in claim 2 wherein said addressing means comprises address means responsive to the actuation of an address key for providing a code for addressing an initial storage location for the key in said memory and for conditioning said programmable memory means to be responsive to the actuation of data keys to load said memory means with a code corresponding to the key, and means activated in response to a particular code from said keyboard for terminating the loading of said memory in response to actuation of said data keys.

7. In an encoding apparatus as defined in claim 2 wherein said addressing means comprises address means responsive to the actuation of an address key for providing a code for addressing an initial storage location for the key in said memory and for conditioning said programmable memory means to be responsive to the actuation of data keys to load said memory means with a code corresponding to the key, means for incrementing the memory addressing means for each entered code, and means responsive to the number of storage locations addressed for terminating the loading of said memory in response to the actuation of an addressing key.

8. An encoding apparatus as defined in claim 2 comprising means responsive to the actuation of an addressing key on said keyboard to address said memory means and read codes therefrom for inhibiting outputs from other keys on said keyboard until the plurality of storage locations in said memory means for the actuated key have been read out to said coding device.

9. An encoding apparatus as defined in claim 3 wherein said key means comprises a plurality of keys for addressing said memory means and responsive to the loading of data from said data keys into said memory means for an actuated addressing key for disenabling said addressing keys from entering new addresses for said data keys, and means responsive to the loading of the memory means for the addressing key controlling the loading for rendering the other addressing keys effective to address the memory.

10. An encoding apparatus as defined in claim 4 wherein said apparatus comprises means responsive to the actuation of an address key during a loading operation for effecting the operation of said device to record a predetermined code and an address code on said record member.

11. An encoding apparatus as defined in claim 1 comprising means for selectively addressing said memory means in response to the actuation of a special key and effecting operation of said coding device to code the key address in advance of codes read from said memory means.

12. An encoding apparatus as defined in claim 3 wherein said memory means comprises a recirculating memory and a shift register comprising an input and output register for said memory and said addressing means when loading said memory means from said keyboard comprises means responsive to the actuation of said addressing key means followed by a data key for loading the code word for the data key in said shift register in parallel and for operating said shift register as a parallel-to-serial shift register to load said memory means.

13. An encoding apparatus as defined in claim 2 wherein said addressing key means may have a two separate plurality of locations for each key and said key means comprises a selector key and means responsive to said selector key for selecting the one of said two separate plurality of locations to be addressed.

14. In an encoding apparatus as defined in claim 13 wherein said encoding means comprises means responsive to a predetermined number of codes being addressed to terminate the addressing operation and said addressing means includes means responsive to said selector key for changing the number of codes addressed for terminating said addressing operation.

* * * * *

Disclaimer 3,737,868.—*Leon Tregerman*, Syosset and *Stanley M. Brindle*, East Setauket, N.Y. APPARATUS FOR PREPARING A BINARY CODED RECORD. Patent dated June 5, 1973. Disclaimer filed Jan. 30, 1975, by the assignee, *Addressograph-Multigraph Corporation.*

Hereby disclaims the remaining term of said patent.

[*Official Gazette July 15, 1975.*]